UNITED STATES PATENT OFFICE.

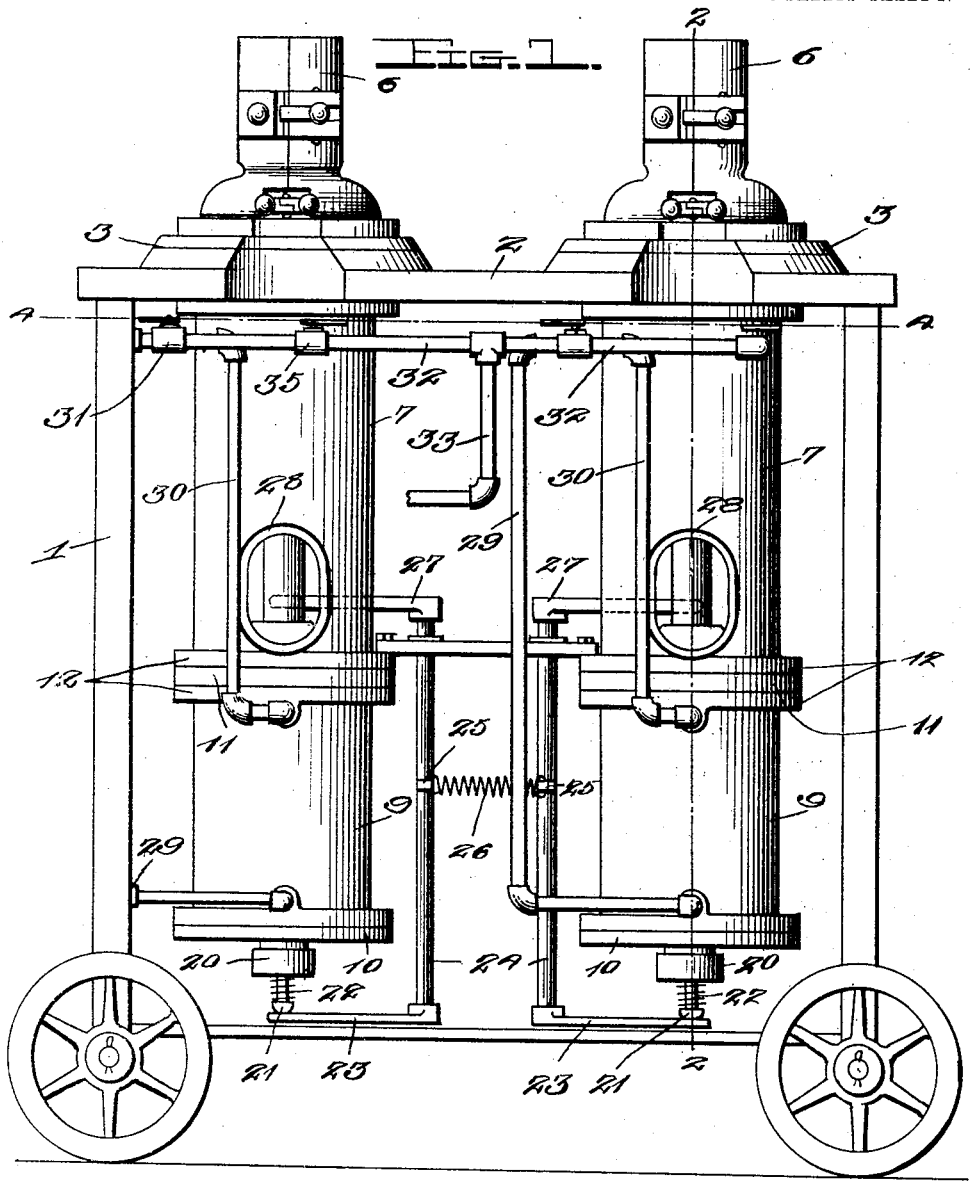

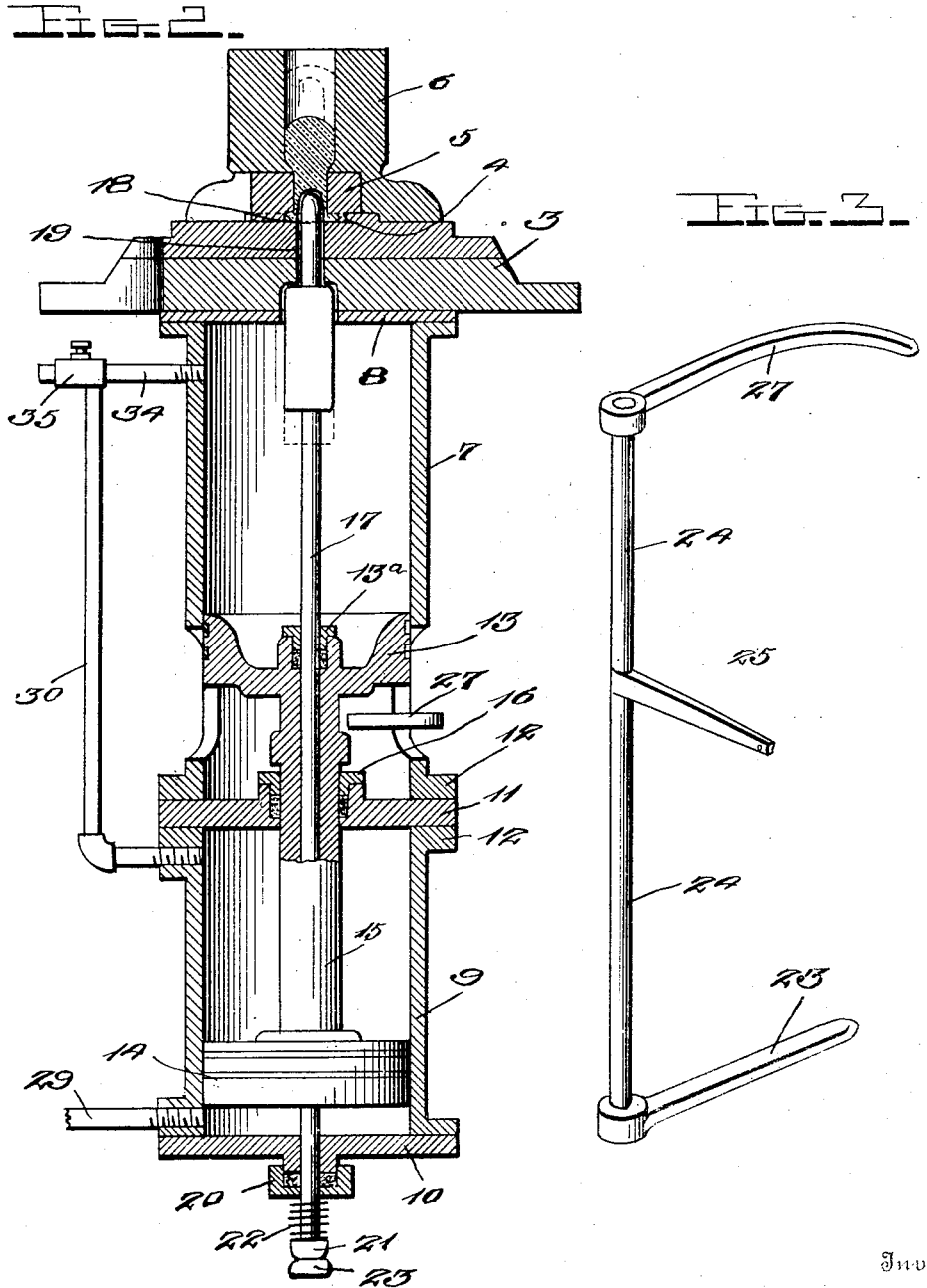

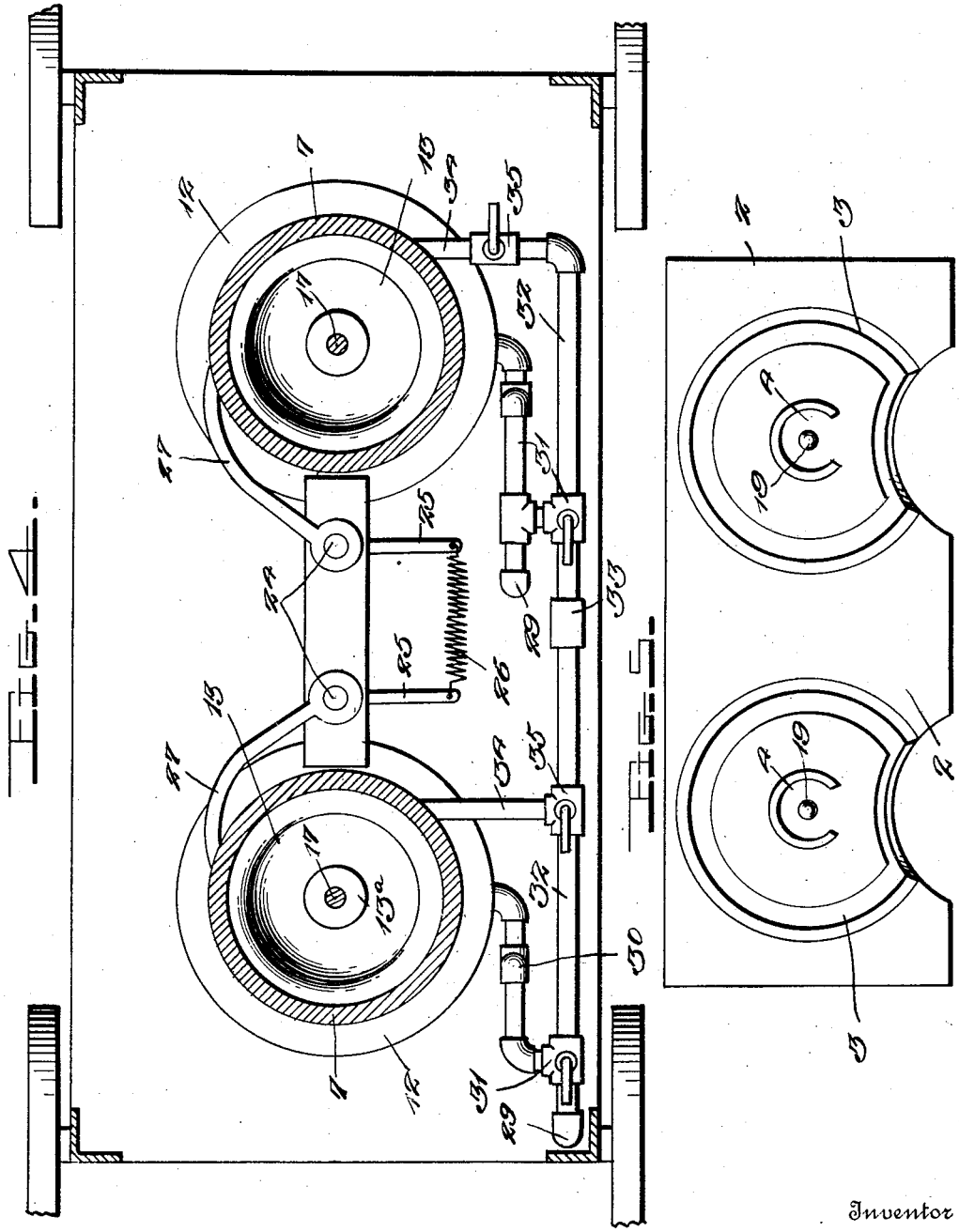

GEORGE C. CRAWFORD, OF BARTLESVILLE, OKLAHOMA.

GLASS-BLOWING MACHINE.

1,039,700.   Specification of Letters Patent.   Patented Oct. 1, 1912.

Application filed March 6, 1912. Serial No. 682,034.

*To all whom it may concern:*

Be it known that I, GEORGE C. CRAWFORD, a citizen of the United States, residing at Bartlesville, in the county of Washington and State of Oklahoma, have invented certain new and useful Improvements in Glass-Blowing Machines, of which the following is a specification, reference being had to the accompanying drawings.

This invention comprehends certain new and useful improvements in glass blowing machines and relates particularly to machines for use in blowing bottles, although it is to be understood that the invention is not limited to this use.

The invention has for its primary object a simple, durable and efficient construction of apparatus of this character which may be conveniently employed to partially blow up the blank, after which the blank mold is opened and the blank with the neck mold attached transferred to the blow mold.

The invention also has for its object a simple and efficient apparatus of this character which will automatically form a partial vacuum underneath and in communication with the bottom of the neck mold for forming a bottle, whereby the molten glass poured therein and into the blank mold, will rapidly flow around a plunger, the end of which projects into the mold and thereby form the neck of the bottle, the parts being so arranged that subsequently to this operation, air may be easily admitted into the neck mold after the plunger has been automatically withdrawn therefrom and the blank thus partially blown up.

A further object of the invention is to provide an improved molding apparatus, the parts of which can be cheaply manufactured and readily assembled and which will not be liable to get out of order or require any unnecessary attention. And the invention also aims to generally improve this class of devices and to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings in which, Figure 1 is a side elevation of a molding apparatus embodying the improvements of my invention. Fig. 2 is a longitudinal sectional view on the line 2—2, of Fig. 1. Fig. 3 is a detail perspective view of the plunger trip. Fig. 4 is a horizontal sectional view, the section being taken through the upper cylinders, and, Fig. 5 is a top plan view of the table or mold support.

Corresponding and like parts are referred to in the following description and designated in the accompanying drawings by like reference characters.

In the present embodiment of my invention, I mount two of my improved molding devices in a frame-work 1 which is supported on the ground or traveling wheels, as shown, and which includes an upper bar 2 which is formed with bosses 3 constituting tables for the mold, and the upper surfaces of said tables being formed with dovetail recesses 4 into which the neck molds 5, may be easily inserted so as to be securely held in place while the molding operations are being performed.

6 designates a blank mold which is adapted to fit around the neck mold 5, it being understood that these molds are of the ordinary character composed of hingedly connected sections having handles by which they are manipulated and carried from one place to another.

While I have shown in the accompanying drawings two of my improved molding devices mounted in the same framework, it is to be understood that the invention is not limited in this regard, and as both of the molding devices are alike, a description of one will suffice for both.

The molding apparatus of my invention includes an upper vertically disposed cylinder 7 provided at its upper end with a head 8, a lower vertically disposed cylinder 9 in longitudinal alinement with the cylinder 7 and provided at its lower end with a head 10 and the interposed partition or head 11 which is secured by bolts or similar fastening devices between the outstanding flanges 12 that are formed on the adjoining ends of said cylinders. A piston 13 is mounted for reciprocation in the upper cylinder 7 and a corresponding piston 14 is mounted in the lower cylinder 9, said cylinders being operatively connected together so as to move simultaneously, through the instrumentality of a tubular piston rod 15 which works through a packing box 16 carried by the intermediate head 11.

A plunger rod 7 is movable through the hollow piston rod 15, being guided in its movements by the packing box 13ª of the piston 13 and a similar packing box (not shown) in the piston 14, the plunger rod passing through the pistons and being formed at its upper end with a plunger 18 which works in an opening 19 formed in the bed or table 3.

The lower end of the plunger 17 extends downwardly through a packing box 20 carried by the lower head 10 of the cylinder 9 and is provided at its extremity with a cup 21 fixed thereon and designed to receive one end of a spring 22 coiled around the lower protruding end of the plunger rod, the upper end of the spring bearing against the packing box 20 and thereby tending to move the plunger rod in a downward direction. To hold the plunger rod in its upper position against the tension of the spring 22, I provide an arm 23 which is adapted to extend underneath the cup 21 and engage the same. The arm 23 is secured at one end to the lower end of a vertically disposed shaft 24 which is mounted in the frame-work 1 to oscillate about its longitudinal axis, said shaft 24 being provided intermediate of its ends with a perpendicularly disposed lug 25 which is connected by a contractile spring 26 to a corresponding lug formed on the corresponding shaft of the other molding apparatus, whereby the shafts are turned automatically in a direction to carry their lower arms 23 underneath the lower extremities of the plunger rods after the latter have been raised. The shaft 24 carries at its upper end a perpendicularly projecting trip arm 27 which is designed to extend into an opening 28 formed in the side wall of the upper cylinder 7 near the lower end thereof, whereby as the upper piston 13 moves downwardly, it will engage the trip arm 27 and move the latter outwardly, that is, in a direction to carry the lower arm 23 out from underneath the lower extremity of the plunger rod 17 so as to permit the spring 22 to act and the plunger rod to be instantly moved downwardly so that its upper end or plunger 18 will be retracted from the neck mold 5.

The lower cylinder 9 is formed at top and bottom with ports into which combined inlet and outlet pipes 29 and 30 lead, the control of the air to and from the pipes 29 and 30 being accomplished by means of a three-way cock 31. The air from a pipe 32 which receives its supply from the pipe 33 and which is connected to the three-way cock 31, is intended to flow also through a pipe 34 into the upper cylinder 7 above the piston 13, the admission of the air into the upper end of the cylinder 7 being controlled by a valve or cock 35.

From the foregoing description in connection with the accompanying drawings, the operation of my improved glass blowing apparatus will be apparent. Air is first admitted by manipulating the three-way cock 31 in the pipe 29, from whence the air passes into the lower cylinder 9 below the lower piston 14, both pistons thereby moving upwardly and the air above the upper piston 13 passing out through the opening 19, for it is to be understood that the opening 19 is of sufficient diameter to permit the air to pass out around the plunger 18. During this operation, the plunger is held in its upper position with its upper end projecting into the neck mold 5 and spaced from the neck forming opening of said mold. The glass is then poured into the blank mold 6 and the air pressure is shut off from below the piston 14 and admitted on top of said piston by means of the pipe 30, it being thus evident that the pipes 29 and 30 each have a double function. That is to say, each is an inlet pipe and an outlet pipe, under certain conditions. Now when the air is exhausting through the pipe 29 and being admitted through the pipe 30 into the lower cylinder 9 on top of the lower piston 14, the pistons 14 and 13 are naturally moving downwardly. As the upper piston 13 moves down, the air beneath said piston is vented through the side opening 28 of the upper cylinder 7, while at the same time the air above the piston 13 has become rarefied so as to produce a partial vacuum above said piston, said vacuum acting upon the glass that is in the blank mold 6 and neck mold 5, whereby the glass is drawn firmly around the space between the plunger 18 and the neck forming opening of the neck mold. In the downward movement of the piston 13, the same will engage the trip arm 27 and turn the shaft 24 against the tension of the spring 26 a distance sufficient to carry the lower arm 23 out from underneath the lower extremity of the plunger rod 17 and the cup 21 which is carried by the lower protruding end of the plunger rod 17, whereupon the spring 22 will be permitted to act and the plunger rod 17 will quickly move downwardly so as to retract the plunger 18 from the opening in the neck mold 5, whereupon the valve or cock 35 is manipulated so as to admit air through the pipe 34 into the cylinder 7 above the upper piston 13, such air effecting a partial blow-up of the blank. The blank mold is then opened and the blank with the neck mold attached, is then transferred to the blow mold where the bottle is finished.

In order to set the plunger 18 in its upper position, the stuffing box 13ᵃ of the piston head 13 on the upward stroke of the latter strikes the shoulder formed at the lower end of the plunger 18, thereby forcing the plunger and plunger rod up in position to receive the glass. This action automatically places the spring 22 under tension, and when the plunger rod 17 moves up to a certain height, the spring 26 acts to turn the arm 23 underneath the cup 21 so as to hold the plunger in its upper position until subsequently tripped.

It is to be noted that the inlet 34 of the cylinder 7 is so placed that when the plunger 18 is withdrawn from the blank, it is in a position to receive a blast of air while the blank is being blown up. In this way, the plunger 18 is cooled, as is necessary.

What I claim is:—

1. A glass blowing machine, including a cylinder, a mold table formed with an opening communicating with the cylinder and adapted to support a mold, a piston mounted in the cylinder, a plunger movable in the cylinder and adapted to project into the mold, means for moving the piston in the cylinder away from the plunger so as to produce a partial vacuum around the plunger as specified, means for withdrawing the plunger, and means for subsequently admitting air into the mold.

2. A glass blowing machine, including a cylinder, a mold support having an opening communicating with the cylinder, a mold adapted to rest on said support and formed with an opening communicating with the opening in the support, a plunger movable in said opening of the support and into the opening in the mold, a piston mounted in the cylinder, air actuated means for automatically retracting the plunger from the mold, and means for admitting air into the cylinder and through the opening in the mold into the mold after the plunger has been retracted from said opening of the support.

3. A machine of the character described, including a cylinder, a piston mounted therein, a plunger mounted in the cylinder, a mold support provided with an opening communicating with said cylinder and in which the plunger works, a mold mounted on said support and having an opening registering with the opening in the support, the plunger being adapted for movement into the mold, air actuated means for moving the piston in a direction to produce a partial vacuum around the plunger in the mold, means operated by and upon the movement of the piston for automatically retracting the plunger from the mold, and means for admitting air into the cylinder and thence to the mold.

4. A glass blowing machine, including a cylinder, a mold support having an opening communicating with the interior of the cylinder, a mold adapted to rest on said support and having an opening communicating with the opening in the support, a plunger movable into and out of the openings in the mold support and mold, means for automatically moving the plunger into said openings, means for creating a partial vacuum in the cylinder and around the plunger with the plunger held in said openings, means for moving the plunger out of said openings, and means for admitting air into the cylinder after the plunger has been retracted from said openings.

5. A glass blowing machine, including longitudinally alined cylinders, pistons mounted in the respective cylinders, one of said cylinders being formed with inlet and outlet openings on opposite sides of the piston thereof and the pistons being operatively connected together for simultaneous movement, a plunger rod extending through said pistons and the cylinders and projecting out of one of the cylinders at one end, a plunger connected to the other end of the plunger rod, a mold support secured to one cylinder and having an opening communicating with said cylinder, the plunger being movable in said opening, means for admitting air into said last named cylinder, means tending to hold the plunger and plunger rod with the plunger protruding from the upper end of the opening of the mold support, and means actuated by the piston of the last named cylinder for automatically releasing the holding means so as to permit a movement of the plunger.

6. A glass blowing machine, including upper and lower cylinders disposed in longitudinal alinement to each other, a mold support resting upon the upper cylinder and having an opening communicating with said cylinder, pistons mounted in the respective cylinders and connected together for simultaneous movement, a plunger rod movable through said pistons and cylinders and projecting out of the lower end of the lower cylinder, a plunger connected to the other end of the plunger rod and mounted in the opening in the mold support, the lower cylinder being formed with inlet and outlet openings for air on opposite faces of its piston, the upper cylinder being also provided with an air inlet opening above its piston and with an opening below its piston leading to the atmosphere, an arm projecting into the last named opening and designed for engagement by the piston of the upper cylinder in the downward movement of said piston, a vertically disposed shaft, to the upper end of which said arm is connected, a lower arm connected to said shaft and adapted to project under the lower end of the plunger rod, and a spring encircling the lower end of the plunger rod and adapted to move the same downwardly upon the movement of the lower arm out from underneath said rod.

7. A glass blowing machine, including a cylinder, a mold table formed with an opening communicating with the cylinder and adapted to support a mold, a piston mounted in the cylinder, a plunger movable in the cylinder and adapted to project into the mold, means for moving the piston in the cylinder away from the plunger so as to produce a partial vacuum around the plunger, means for withdrawing the plunger, means for subsequently admitting air into the mold, and means operable by the piston moving in the opposite direction for automatically resetting the plunger.

8. A glass blowing machine, including upper and lower cylinders, a mold table formed with an opening communicating with the upper cylinder and adapted to support a mold, a piston mounted in the upper cylinder, a piston mounted in the lower cylinder, a tubular piston rod connecting said pistons for simultaneous movement, a plunger movable in the upper cylinder and adapted to project into the mold, a plunger rod carrying the plunger and movable through the pistons and the piston rod, means for holding the plunger rod with the plunger in the opening in the mold, means for admitting air into the lower cylinder for moving the pistons downwardly, whereby the upper piston will create a partial vacuum around the plunger, means for automatically releasing the plunger and permitting it to move downwardly by and upon the downward movement of the upper piston, means for subsequently admitting air into the upper cylinder, and means for admitting air into the lower cylinder below the lower piston.

In testimony whereof I hereunto affix my signature in the presence of two witnesses.

GEORGE C. CRAWFORD.

Witnesses:
JOHN H. KANE,
E. K. SHELLER.

Copies of this patent may be obtained for five cents each, by addressing the "Commissioner of Patents, Washington, D. C."